United States Patent
Seok et al.

(10) Patent No.: US 10,827,519 B2
(45) Date of Patent: Nov. 3, 2020

(54) MULTI-TID A-MPDU TRANSMISSION

(71) Applicant: MediaTek Singapore Pte. Ltd., Solaris (SG)

(72) Inventors: Yongho Seok, San Jose, CA (US); Chao-Chun Wang, San Jose, CA (US); Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 39 days.

(21) Appl. No.: 16/053,784

(22) Filed: Aug. 2, 2018

(65) Prior Publication Data

US 2019/0045537 A1 Feb. 7, 2019

Related U.S. Application Data

(60) Provisional application No. 62/540,636, filed on Aug. 3, 2017.

(51) Int. Cl.
*H04H 20/71* (2008.01)
*H04W 74/00* (2009.01)
(Continued)

(52) U.S. Cl.
CPC ......... *H04W 74/004* (2013.01); *H04L 1/1685* (2013.01); *H04L 1/1854* (2013.01);
(Continued)

(58) Field of Classification Search
None
See application file for complete search history.

(56) References Cited

U.S. PATENT DOCUMENTS 30,121,286   5/2013   Trainin ................... 370/329
80,183,548   6/2018   Gan et al.
(Continued)

FOREIGN PATENT DOCUMENTS

WO   WO2017036214 A1   3/2017
WO   WO2017054561 A1   4/2017

OTHER PUBLICATIONS

Taiwan IPO, office action for the TW patent application 107127093 (no English translation is available) dated Jul. 29, 2019 (12 pages).
(Continued)

*Primary Examiner* — Phirin Sam
(74) *Attorney, Agent, or Firm* — Imperium Patent Works; Mark Marrello

(57) ABSTRACT

A method of data acknowledgement includes: transmitting data from a wireless station, transmitting a Block Acknowledgement Request (BAR) from the wireless station, and receiving a Block Acknowledgement (BA) by the wireless station. In one example, the step of transmitting BAR by the wireless station requests an acknowledgment for transmitted data with an access category that has the same priority as the a primary access category. In another example, the step of transmitting BAR by the wireless station requests an acknowledgment for transmitted data with an access category that has the same or higher priority than a primary access category. A wireless device includes at least one transceiver to exchange data with another wireless device, at least one processor, and a memory storing instructions that, when executed by the one or more processors, cause the wireless device to: transmit data, transmit a Block Acknowledgement Request (BAR), and receive a Block Acknowledgement (BA).

15 Claims, 6 Drawing Sheets

(51) Int. Cl.
  *H04L 1/18* (2006.01)
  *H04L 1/16* (2006.01)
  *H04W 72/04* (2009.01)
  *H04W 72/10* (2009.01)
  *H04W 72/12* (2009.01)

(52) U.S. Cl.
  CPC ....... *H04W 72/0446* (2013.01); *H04W 72/10* (2013.01); *H04W 72/121* (2013.01)

(56) References Cited

U.S. PATENT DOCUMENTS

| | | | |
|---|---|---|---|
| 2006/0239213 A1 | 10/2006 | Frederiks et al. | 370/278 |
| 2008/0212612 A1 | 9/2008 | Singh et al. | 370/474 |
| 2009/0235066 A1 | 9/2009 | Ptasinski et al. | 713/150 |
| 2011/0222408 A1* | 9/2011 | Kasslin | H04L 41/083 370/241 |
| 2011/0255618 A1 | 10/2011 | Zhu et al. | 375/260 |
| 2011/0268094 A1* | 11/2011 | Gong | H04L 1/1685 370/338 |
| 2016/0242195 A1* | 8/2016 | Kwon | H04L 5/0037 |
| 2017/0201905 A1* | 7/2017 | Trainin | H04W 28/065 |
| 2017/0272138 A1* | 9/2017 | Chun | H04L 29/08 |
| 2017/0288930 A1* | 10/2017 | Oh | H04L 27/2626 |
| 2017/0311310 A1* | 10/2017 | Ryu | H04W 84/12 |
| 2017/0332385 A1* | 11/2017 | Shirali | H04W 28/0268 |
| 2017/0366312 A1* | 12/2017 | Chu | H04W 72/0413 |
| 2018/0263047 A1* | 9/2018 | Kim | H04L 69/22 |
| 2019/0104531 A1* | 4/2019 | Kwon | H04L 25/0204 |
| 2019/0149210 A1* | 5/2019 | Seok | H04B 7/0452 |
| 2019/0349150 A1* | 11/2019 | Chu | H04L 5/003 |

OTHER PUBLICATIONS

Taiwan IPO, office action for the TW patent application 107130008 (no English translation is available) dated May 28, 2019 (8 pages).
International Search Report and Written Opinion of International Search Authority for PCT/CN2018/098613 dated Sep. 25, 2018 (9 pages).

* cited by examiner

MULTI-TID A-MDPU (DATA)
PRIMARY ACCESS CATEOGRY = AC_VI

MULTI-TID BLOCK ACK REQUEST (BAR)
BAR ONLY REQUESTS ACK INFO FOR DATA WITH A TRAFFIC IDENTIFIER THAT HAS A PRIORITY LEVEL THAT IS THE SAME AS THE PRIORITY LEVEL OF THE PRIMARY ACCESS CATEGORY AC_VI.

MULTI-TID BLOCK ACK (BA)

BAR ONLY REQUESTS ACK INFO FOR DATA ASSOCIATED WITH TRAFFIC IDENTIFIERS WITH A PRIMARY ACCESS CATEGORY EQUAL TO OR GREAT THAN THE PRIMARY ACCESS CATEGORY.

MULTI-TID A-MPDU TRANSMISSION

CROSS REFERENCE TO RELATED APPLICATIONS

This application claims priority under 35 U.S.C. § 119 from U.S. Provisional Application No. 62/540,636, entitled "Multi-TID A-MPDU Transmission," filed on Aug. 3, 2017, the subject matter of which is incorporated herein by reference.

TECHNICAL FIELD

The disclosed embodiments relate generally to wireless network communications, and, more particularly, to multiple Traffic Identifier (TID) Block Acknowledgement Requests (BAR) in wireless local area networks.

BACKGROUND

IEEE 802.11 is a set of media access control (MAC) and physical layer (PHY) specification for implementing wireless local area network (WLAN) communication, in the unlicensed (2.4, 3.6, 5, and 60 GHz) frequency bands. The standards and amendments provide the basis for wireless network products using the IEEE 802.11 frequency bands. IEEE 802.11 plays an important role in the growing need for high bandwidth data communications.

A wireless communication protocol may be a contention-based protocol, such as the Institute of Electrical and Electronics Engineers (IEEE) 802.11 set of wireless communication protocols are contention-based protocols. A contention-based protocol allows many stations, also referred to as users, to use the same channel without pre-coordination. In a contention-based protocol, a station checks that no other station is using the channel. If another station is using the channel, the station waits until the channel is free.

A contention-based wireless communication protocol may perform block acknowledgment. In block acknowledgement, a wireless device in the wireless network requests an acknowledgement of one or more frames from another device. Specifically, the transmitting device sends a block acknowledgement request (BAR) frame to the receiving device. In response, the receiving device sends a block acknowledgement (BA) frame to the transmitting device that acknowledges whether the one or more frames were successfully received. Because multiple frames can be acknowledged in a single BA frame, block acknowledgment often improves reliability and media access control (MAC) efficiency for a wireless communication protocol.

However, because a station may need to wait to access the channel in a contention-based wireless communication protocol, the receiving device may be slow to send a BA frame to the transmitting device. This increases power usage because the receiving device repeatedly polls the channel to check that no other station is using it. This also decreases the data transmission rate and increases latency. Finally, there may be increased network congestion because multiple stations are forced to send BA frames one after the other to the transmitting device.

A contention-based wireless communication may allow multiple BA frames to be included in a single frame. For example, a proposal for the IEEE 802.11ax standard allows multiple BA frames to be included in a single multiuser physical layer convergence physical layer protocol data unit (MU-PPDU). Specifically, a multi-station block acknowledgment (M-BA) frame enables an access point to send multiple BA frames in one downlink (DL) frame in response to an uplink (UL) frame, e.g., an UL MU-PPDU frame.

SUMMARY

In a first novel aspect, a method of data acknowledgement including: transmitting data from a wireless station, transmitting a Block Acknowledgement Request (BAR) from the wireless station, and receiving a Block Acknowledgement (BA) by the wireless station.

In one example, the BAR requests an acknowledgment for transmitted data with an access category that has the same priority as a primary access category.

In another example, the BAR requests an acknowledgment for transmitted data with an access category that has the same or higher priority than a primary access category.

In a second novel aspect, a wireless device includes a least one transceiver to exchange data with another wireless device, at least one processor, and a memory storing instructions that, when executed by the one or more processors, cause the wireless device to: transmit data, transmit a Block Acknowledgement Request (BAR), and receive a Block Acknowledgement (BA).

In one example, the BAR requests an acknowledgment for transmitted data with an access category that has the same priority as a primary access category.

In another example, the BAR requests an acknowledgment for transmitted data with an access category that has the same or higher priority than a primary access category.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Provided herein are system, apparatus, device, method and/or computer program product embodiments, and/or combinations and sub-combinations thereof, for providing Multiple Traffic Identification (M-TID) Block Acknowledgment Request (BAR) in a wireless communication protocol. Embodiments operate by generating and transmitting Multiple Traffic Identification (M-TID) Block Acknowledgment Request (BAR) based on the priority of the access category that is associated with the data transmitted.

Figure 1:
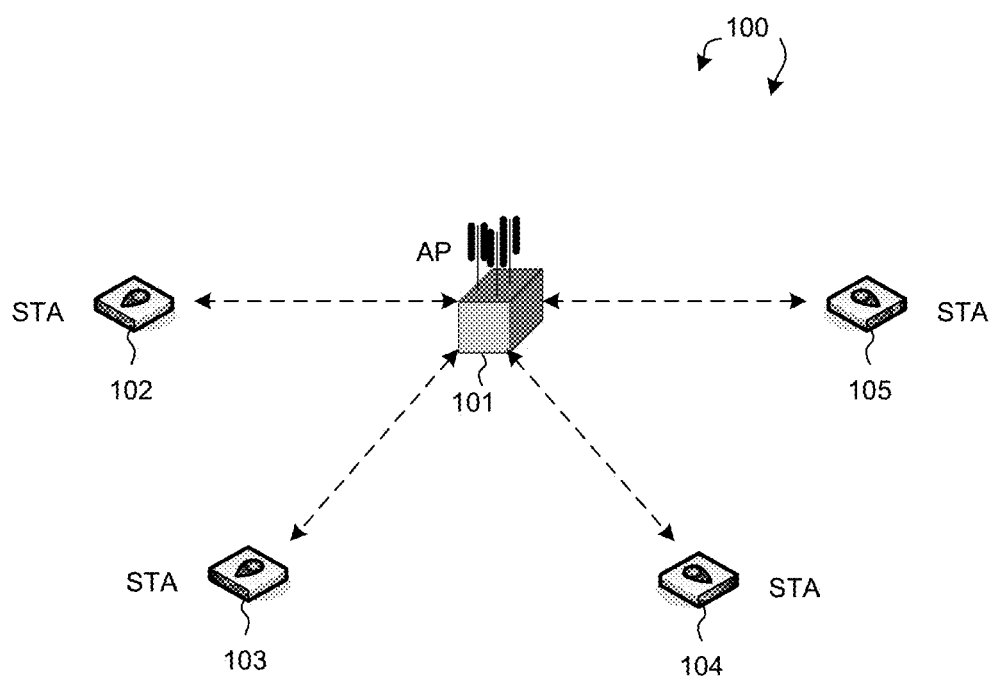
FIG. 1 illustrates a wireless network 100.

FIG. 1 illustrates a wireless network 100. For example, the WLAN may use the IEEE 802.11ax standard (current proposals and/or future versions), or various other wireless communication protocols.

FIG. 1 includes an access point 101 and wireless stations 102-105 that communicate over the WLAN. Access point 101 may be an access point (AP) that transmits and receives frames over the WLAN. Wireless Stations 102-105 may be any wireless communication devices configured to communicate in the WLAN, such as a desktop computer, laptop computer, smart phone, smart device, or various other devices as would be appreciated by a person of ordinary skill in the art.

In some embodiments, access point 101 can connect (communicatively) wireless stations 102 to station 103 within the WLAN. Specifically, station 102 may transmit a frame to station 103 by transmitting the frame to access point 101. Access point 101 may then transmit the frame to station 103. Similarly, station 103 may transmit a frame to station 102 by transmitting the frame to access point 101. Access point 101 may then transmit the frame to station 102.

In some embodiments, stations may transmit and receive frames using block acknowledgment. Specifically, an AP may transmit a block acknowledgement request (BAR) frame to a station. In response, the station may transmit, to the AP, a single block acknowledgement (BA) frame acknowledging receipt of one or more frames. Alternatively, a wireless station can send a block acknowledgment request (BAR) to an AP. In some embodiments, a single BA frame may be solicited in any/all of uplink (UL), downlink (DL), and peer-to-peer transmissions, as well as in unicast and multicast transmissions.

For example, access point 101 may transmit a BAR to station 102. In response, station 102 may acknowledge receipt of one or more frames by transmitting BA to access point 101.

In some embodiments, the BAR may solicit block acknowledgment for multiple frames from station 102. The BAR may include a sequence number of a starting frame being solicited for acknowledgement and a bitmap. A bit in the bitmap may represent a single data frame being solicited for acknowledgment. A sequence number for the frame being solicited for acknowledgement may be equal to the sequence number of the starting frame and the bit number.

In some embodiments, the BA may indicate the data frames received at station 102. Specifically, the BA may include a bitmap that indicates the data frames received. A bit in the bitmap may represent a receipt status of a single data frame solicited for acknowledgment. A bit value of '1' may indicate the corresponding data frame is successfully received. A bit value of '0' may indicate the corresponding data frame is not received.

Similarly, access point 101 may transmit the BAR to wireless station 103. In response, wireless station 103 may acknowledge receipt of one or more frames by transmitting the BA to access point 101.

In some embodiments, the BAR may solicit block acknowledgment for multiple data frames from station 103. The BAR may include a sequence number of a starting data frame being solicited for acknowledgement and a bitmap. A bit in the bitmap may represent a single data frame being solicited for acknowledgment. A sequence number for the data frame being solicited for acknowledgement may be equal to the sequence number of the starting data frame and the bit number.

In some embodiments, the BA may indicate the data frames received at wireless station 103. Specifically, the BA may include a bitmap that indicates the data frames received. A bit in the bitmap may represent a receipt status of a single data frame solicited for acknowledgment. A bit value of '1' may indicate the corresponding data frame is successfully received. A bit value of '0' may indicate the corresponding data frame is not received.

In some embodiments, a wireless station (STA) may transmit a BA frame when no other station uses the wireless channel. In other words, two stations may not transmit BA frames at the same time. This may create network congestion because an excessive number of BAR and BA frames may be transmitted by an access point and one or more stations.

For example, wireless station 102 may not transmit a BA when wireless station 103 is transmitting a BA. In other words, wireless stations 102 and 103 may need to send separate BA frames at separate times to acknowledge receipt of their frames. This may create excessive network congestion. Therefore, there is a need to solicit multiple BA frames in one UL multiuser transmission.

Figure 2:
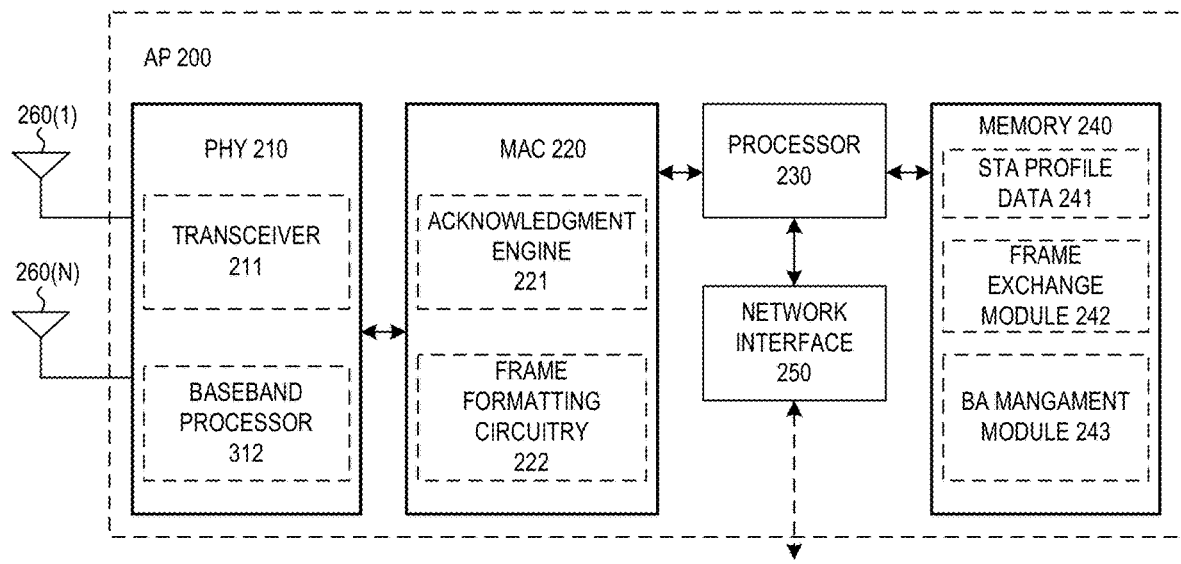
FIG. 2 is a simplified bock diagram of an access point (AP) that can carry out certain embodiments of the invention.

FIG. 2 is a simplified bock diagram of an access point (AP) that can carry out certain embodiments of the invention.

FIG. 2 shows an example AP 200 that may be one embodiment of the AP 101 of FIG. 1. AP 200 may include a PHY device 210 including at least a number of transceivers 211 and a baseband processor 212, may include a MAC 220 including at least a number of acknowledgement engines 221 and frame formatting circuitry 222, may include a processor 230, may include a memory 240, may include a network interface 250, and may include a number of antennas 260(1)-260(N). The transceivers 211 may be coupled to antennas 260(1)-260(N), either directly or through an antenna selection circuit (not shown for simplicity). The transceivers 211 may be used to communicate wirelessly with one or more wireless stations (STAs), with one or more other access points (APs), and/or with other suitable devices. Although not shown in FIG. 2 for simplicity, the transceivers 211 may include any number of transmit chains to process and transmit signals to other wireless devices via antennas 260(1)-260(N), and may include any number of receive chains to process signals received from antennas 260(1)-260(N). Thus, for example embodiments, the AP 200 may be configured for MIMO operations including, for example, SU-MIMO operations and MU-MIMO operations.

The baseband processor 212 may be used to process signals received from processor 230 and/or memory 240 and to forward the processed signals to transceivers 211 for transmission via one or more of antennas 260(1)-260(N), and may be used to process signals received from one or more of antennas 260(1)-260(N) via transceivers 211 and to forward the processed signals to processor 230 and/or memory 240.

The network interface 250 may be used to communicate with a WLAN server (not shown for simplicity) either directly or via one or more intervening networks and to transmit signals.

Processor 230, which is coupled to PHY device 210, to MAC 220, to memory 240, and to network interface 250, may be any suitable one or more processors capable of executing scripts or instructions of one or more software programs stored in AP 200 (e.g., within memory 2). For purposes of discussion herein, MAC 220 shown in FIG. 2 is coupled between PHY device 210 and processor 230. In other embodiments, PHY device 210, MAC 220, processor 230, memory 240, and/or network interface 250 may be connected together using one or more buses (not shown for simplicity).

The contention engines 221 may contend for access to the shared wireless medium, and may also store packets for transmission over the shared wireless medium. For some embodiments, AP 200 may include one or more acknowledgment engines 221 to determine what acknowledgment requests are sent based at least in part on a plurality of different access categories. For other embodiments, the acknowledgment engines 221 may be separate from MAC 220. For still other embodiments, the acknowledgment engines 221 may be implemented as one or more software modules (e.g., stored in memory 240 or within memory provided within MAC 220) containing instructions that, when executed by processor 230, perform the functions of acknowledgment engines 221.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

Memory 240 may include a STA profile data store 241 that stores profile information for a plurality of STAs. The profile information for a particular STA may include information including, for example, its MAC address, supported data rates, supported channel access protocols, connection history with the STA, and/or any other suitable information pertaining to or describing the operation of the STA. Memory 240 may also include a BA session store 244 that stores BA session information (e.g., BA policies, BA timeout values, buffer sizes, aggregation policies, TID values, and so on) for a number of active BA sessions between AP 300 and other wireless devices. For at least some embodiments, the BA session store 244 may also store BA session information for a number of previous or inactive BA sessions between AP 200 and other wireless.

Memory 240 may also include a non-transitory computer-readable medium (e.g., one or more nonvolatile memory elements, such as EPROM, EEPROM, Flash memory, a hard drive, and so on) that may store at least the following software (SW) modules: a frame formatting and exchange software module 242 to facilitate the creation and exchange of any suitable frames (e.g., data frames, action frames, and management frames) between AP 20 and other wireless devices; and a BA session management software module 243 to facilitate the establishment, operation, and/or teardown of block acknowledgment sessions used by AP 200 in communications with one or more other STAs or APs.

Each software module includes instructions that, when executed by processor 230, cause AP 200 to perform the corresponding functions. The non-transitory computer-readable medium of memory 240 thus includes instructions for performing all or a portion of the AP-side operations depicted in FIGS. 4-11.

Processor 230 may execute the frame formatting and exchange software module 242 to facilitate the creation and exchange of any suitable frames (e.g., data frames, action frames, and management frames) between AP 200 and other wireless devices. Processor 230 may also execute the frame formatting and exchange software module 242 to create block acknowledgement IEs that may include BA session information (e.g., BA policies, BA timeout values, buffer sizes, aggregation policies, TID values, and so on) and/or to embed or otherwise insert the block acknowledgement IEs into association response frames, ADDBA request frames, ADDBA response frames, and/or DELBA frames to be transmitted to other wireless devices. Processor 230 may also execute the BA session management software module 243 to facilitate the establishment, operation, and teardown of block acknowledgment sessions used by AP 200 in communications with one or more other STAs or APs.

Figure 3:
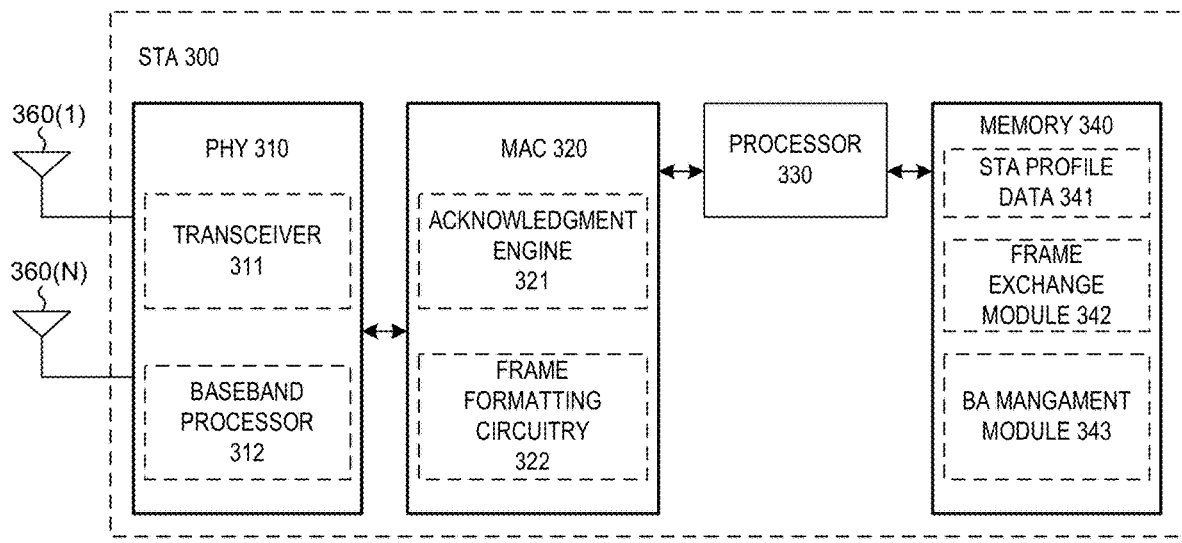
FIG. 3 is a simplified bock diagram of a wireless station (STA) point that can carry out certain embodiments of the invention.

FIG. 3 shows an example STA 300 that may be one embodiment of one or more of the wireless stations 102-105 of FIG. 1. The STA 300 may include a physical layer (PHY) device 310 including at least one transceivers 311 and a baseband processor 312, may include a MAC 320 including at least a number of contention engines 321 and frame formatting circuitry 322, may include a processor 330, may include a memory 340, and may include a number of antennas 350(1)-350(N). The transceivers 311 may be coupled to antennas 350(1)-350(N), either directly or through an antenna selection circuit (not shown for simplicity). The transceivers 311 may be used to transmit signals to and receive signals from AP 101 and/or other STAs (see also FIG. 1), and may be used to scan the surrounding environment to detect and identify nearby access points and/or other STAs (e.g., within wireless range of STA 300). Although not shown in FIG. 3 for simplicity, the transceivers 311 may include any number of transmit chains to process and transmit signals to other wireless devices via antennas 350(1)-350(N), and may include any number of receive chains to process signals received from antennas 350(1)-350(N). Thus, for example embodiments, the STA 300 may be configured for multiple-input, multiple-output (MIMO) operations. The MIMO operations may include single-user MIMO (SU-MIMO) operations and multi-user MIMO (MU-MIMO) operations.

The baseband processor 312 may be used to process signals received from processor 330 and/or memory 340 and to forward the processed signals to transceivers 311 for transmission via one or more of antennas 350(1)-350(N), and may be used to process signals received from one or more of antennas 350(1)-350(N) via transceivers 311 and to forward the processed signals to processor 330 and/or memory 340.

For purposes of discussion herein, MAC 320 is shown in FIG. 3 as being coupled between PHY device 310 and processor 330. For actual embodiments, PHY device 310, MAC 320, processor 330, and/or memory 340 may be connected together using one or more buses (not shown for simplicity).

The acknowledgment engines 321 may determine what type of acknowledgment requests are to be sent based at least in part on the priority level of the data transmitted. The STA 300 may include one or more acknowledgment engines 321 for each of a plurality of different access categories. For other embodiments, the acknowledgment engines 321 may be separate from MAC 320. For still other embodiments, the contention engines 321 may be implemented as one or more software modules (e.g., stored in memory 340 or stored in memory provided within MAC 320) containing instructions that, when executed by processor 330, perform the functions of contention engines 321.

The frame formatting circuitry 322 may be used to create and/or format frames received from processor 330 and/or memory 340 (e.g., by adding MAC headers to PDUs provided by processor 330), and may be used to re-format frames received from PHY device 310 (e.g., by stripping MAC headers from frames received from PHY device 310).

Memory 340 may include an AP profile data store 341 that stores profile information for a plurality of APs. The profile information for a particular AP may include information including, for example, the AP's service set identification (SSID), MAC address, channel information, received signal strength indicator (RSSI) values, goodput values, channel state information (CSI), supported data rates, supported channel access protocols, connection history with the AP, a trustworthiness value of the AP (e.g., indicating a level of confidence about the AP's location, etc.), and/or any other suitable information pertaining to or describing the operation of the AP. Memory 340 may also include a BA session store 344 that stores BA session information (e.g., BA policies, BA timeout values, buffer sizes, aggregation policies, TID values, and so on) for a number of active BA sessions between STA 300 and other wireless devices. For at least some embodiments, the BA session store 344 may also store BA session information for a number of previous or inactive BA sessions between STA 300 and other wireless devices.

Memory 340 may also include a non-transitory computer-readable medium (e.g., one or more nonvolatile memory elements, such as EPROM, EEPROM, Flash memory, a hard drive, and so on) that may store at least the following software (SW) modules: a frame formatting and exchange software module 342 to facilitate the creation and exchange of any suitable frames (e.g., data frames, action frames, and management frames) between STA 300 and other wireless devices; and a BA session management software module 343 to facilitate the establishment, operation, and/or teardown of block acknowledgment sessions used by STA 300 in communications with one or more other STAs or APs.

Each software module includes instructions that, when executed by processor 330, cause STA 300 to perform the corresponding functions. The non-transitory computer-readable medium of memory 340 thus includes instructions for performing all or a portion of the STA-side operations depicted in FIGS. 4-11.

Processor 330, which is shown in the example of FIG. 3 as coupled to PHY device 310, to MAC 320, and to memory 340, may be any suitable one or more processors capable of executing scripts or instructions of one or more software programs stored in STA 300 (e.g., within memory 340). For example, processor 330 may execute the frame formatting and exchange software module 342 to facilitate the creation and exchange of any suitable frames (e.g., data frames, action frames, and management frames) between STA 300 and other wireless devices. The frame formatting and exchange software module 342 may be also be executed by processor 330 to create block acknowledgment IEs that may include BA session information (e.g., BA policies, BA timeout values, buffer sizes, aggregation policies, TID values, and so on) and/or to embed or otherwise insert the block acknowledgement IEs into association request frames, ADDBA request frames, ADDBA response frames, and/or DELBA frames to be transmitted to other wireless devices. Processor 330 may also execute the BA session management software module 342 to facilitate the establishment, operation, and teardown of block acknowledgment sessions used by STA 300 in communications with one or more other STAs or APs.

Figure 4:
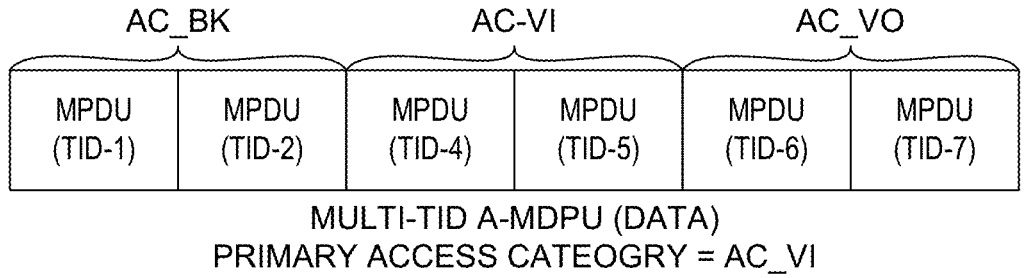
FIG. 4 illustrates a first example of a Multiple Traffic Identification (M-TID) Aggregate MAC Protocol Data Unit (A-MPDU).

FIG. 4 illustrates a first example of a Multiple Traffic Identification (M-TID) Aggregate MAC Protocol Data Unit (A-MPDU). The M-TID A-MPDU includes six MAC Protocol Data Units (MPDUs). Each MPDU has a Traffic Identification (TID) number ranging from one (TID-1) to seven (TID-7). The first two MPDUs have a TID of TID-1 and TID-2 and both are assigned to an access category of background (AC_BK). The next two MPDUs have a TID of TID-4 and TID-5 and both are assigned to an access category of video (AC_VI). The last two MPDUs have a TID of TID-6 and TID-7 and are assigned to an access category of voice (AC_VO). The various access categories are assigned relative priority levels within the wireless network. For example, access category video has a higher priority that access category background. Data with the highest priority is communicated by the network before data with lower priority is communicated.

Figure 5:
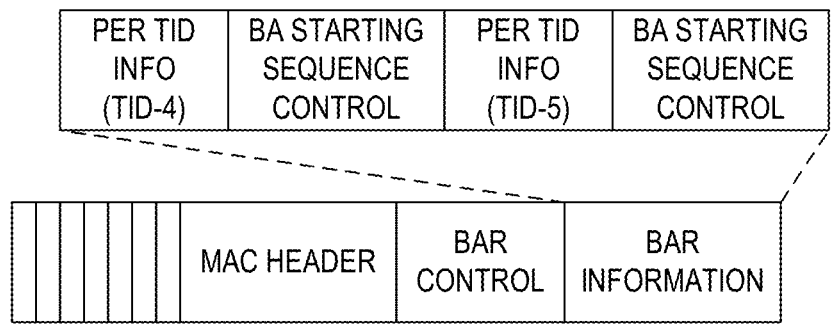
FIG. 5 illustrates a first example of a Multiple Traffic Identification (M-TID) Block Acknowledgment Request (BAR).

FIG. 5 illustrates a first example of a Multiple Traffic Identification (M-TID) Block Acknowledgment Request (BAR). The M-TID BAR indicates for which TIDs an acknowledgment is requested. In the example of FIG. 5, the M-TID BAR only requests acknowledgment for transmitted data that has a TID that has a priority level that is the same as the priority level of the primary access category. In the example of FIG. 5, two of the MDPUs have an access category that is the same as the primary access category of AC_VI, namely TID-4 and TID-5. Therefore, the BAR information included in the M-TID BAR includes the TID information and the Block Acknowledgment (BA) starting sequence control information for only MPDUs TID-4 and TID-5.

Figure 6:
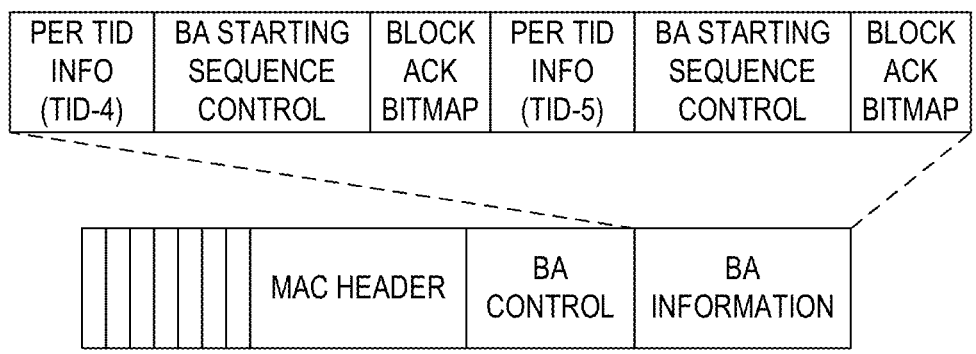
FIG. 6 illustrates a first example of a Multiple Traffic Identification (M-TID) Block Acknowledgement (BA).

FIG. 6 illustrates a first example of a Multiple Traffic Identification (M-TID) Block Acknowledgement (BA). In response to transmitting the M-TID BAR, the M-TID BA is received. The M-TID BA includes a BA information field. The BA information field includes TID information, BA starting sequence control information and BA bitmap information for each requested TID, namely TID-4 and TID-5. In this fashion, acknowledgment of proper communication of TID-4 data and TID-5 data is provided. However, this process requires the wireless station to transmit multiple M-TID BARs if some of the TIDs of the MPDU included in the A-MPDU do not correspond to the primary access category. For example, in the present example the wireless station would be required to transmit two more M-TID BARs to get acknowledgment for TIDs with an access category of AC_BK and AC_VO.

Figure 7:
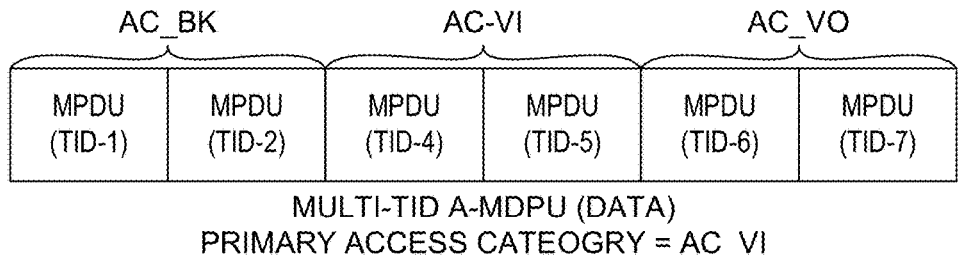
FIG. 7 illustrates a second example of a Multiple Traffic Identification (M-TID) Aggregate MAC Protocol Data Unit (A-MPDU).

FIG. 7 illustrates a second example of a Multiple Traffic Identification (M-TID) Aggregate MAC Protocol Data Unit (A-MPDU). The M-TID A-MPDU includes six MAC Protocol Data Units (MPDUs). Each MPDU has a Traffic Identification (TID) number ranging from one (TID-1) to seven (TID-7). The first two MPDUs have a TID of TID-1 and TID-2 and both are assigned to an access category of background (AC_BK). The next two MPDUs have a TID of TID-4 and TID-5 and both are assigned to an access category of video (AC_VI). The last two MPDUs have a TID of TID-6 and TID-7 and are assigned to an access category of voice (AC_VO). The various access categories are assigned relative priority levels within the wireless network. For example, access category video has a higher priority that access category background. Data with the highest priority is communicated by the network before data with lower priority is communicated.

Figure 8:
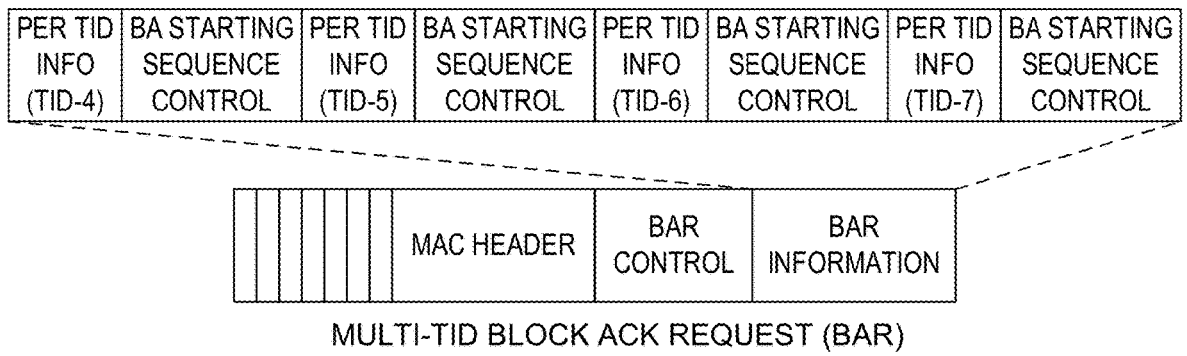
FIG. 8 illustrates a second example of a Multiple Traffic Identification (M-TID) Block Acknowledgment Request (BAR).

FIG. 8 illustrates a second example of a Multiple Traffic Identification (M-TID) Block Acknowledgment Request (BAR). The M-TID BAR indicates for which TIDs an acknowledgment is requested. In the example of FIG. 8, the M-TID BAR only requests acknowledgment for transmitted data that has a TID that has a priority level that is the same or greater than the priority level of the primary access category. In the example of FIG. 8, four of the MDPUs have an access category that is the same or greater than the primary access category of AC_VI, namely TID-4, TID-5, TID-6, and TID-7. Therefore, the BAR information included in the M-TID BAR includes the TID information and the Block Acknowledgment (BA) starting sequence control information for MPDUs TID-4, TID-5, TID-6, and TID-7.

Figure 9:
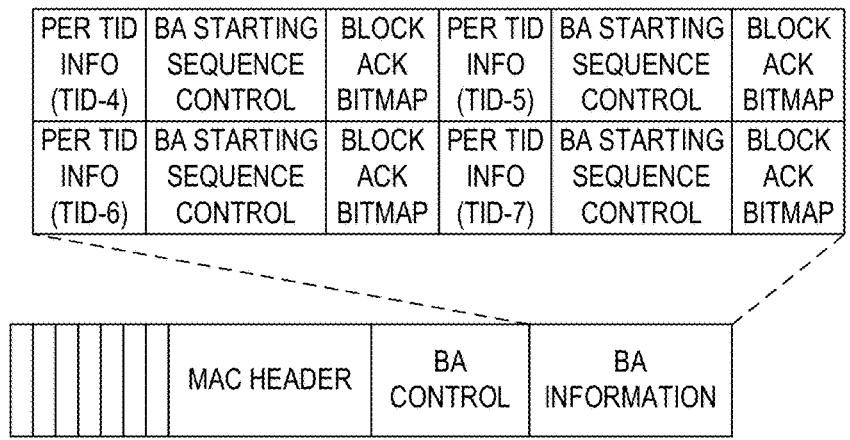
FIG. 9 illustrates a second example of a Multiple Traffic Identification (M-TID) Block Acknowledgement (BA).

FIG. 9 illustrates a second example of a Multiple Traffic Identification (M-TID) Block Acknowledgement (BA). In response to transmitting the M-TID BAR, the M-TID BA is received. The M-TID BA includes a BA information field. The BA information field includes TID information, BA starting sequence control information and BA bitmap information for each requested TID, namely TID-4, TID-5, TID-6, and TID-7. In this fashion, acknowledgment of proper communication of TID-4 data, TID-5 data, TID-6 data, and TID-7 data is provided. This process is an improvement in that it requires the wireless station to transmit fewer M-TID BARs even though some of the TIDs of the MPDU included in the A-MPDU do not correspond to the primary access category. For example, in the present example the wireless station would be required only to transmit one more M-TID BAR to get acknowledgment for TIDs with an access category of AC_BK, because the TID with an access category of AC_VO have a higher priority and therefore are included with first M-TID BAR. This solution is also beneficial in that it complies with the network's underlying Quality of Service requirements that require that higher priority data is communicated before lower priority data is communicated.

Figure 10:
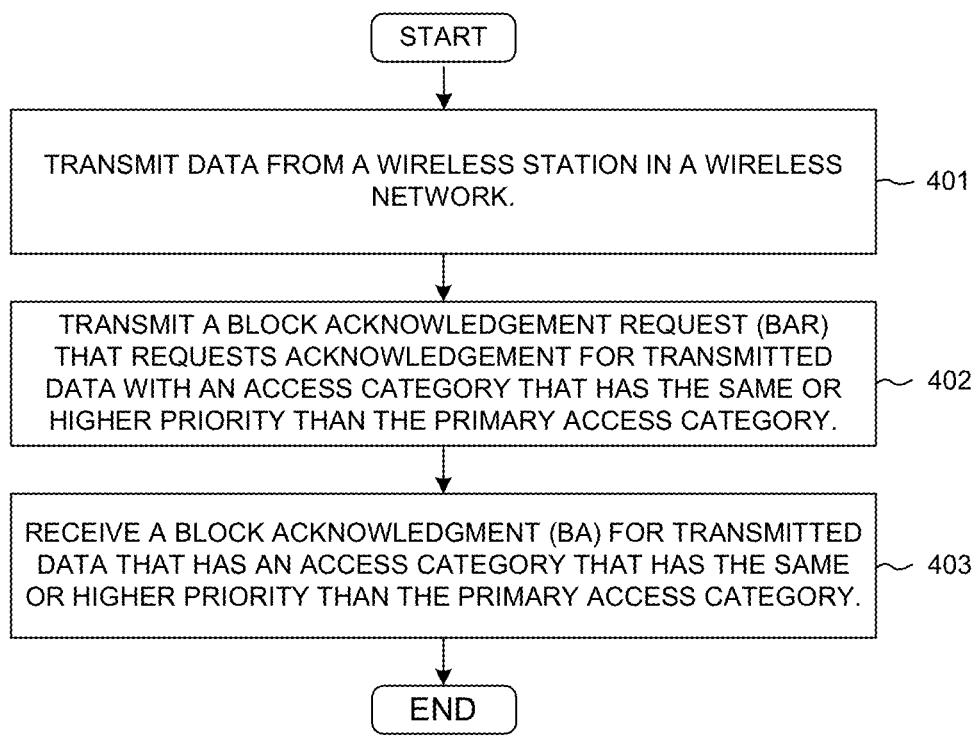
FIG. 10 is a flow chart of a method of determining a Multiple Traffic Identification (M-TID) Block Acknowledgment Request (BAR) in accordance with one novel aspect.

FIG. 10 is a flow chart of a method of determining a Multiple Traffic Identification (M-TID) Block Acknowledgment Request (BAR) in accordance with one novel aspect. In step 401, data is transmitted from a wireless station within a wireless network. In step 402, a Block Acknowledgment Request (BAR) is transmitted. The BAR requests acknowledgment for transmitted data with an access category that has the same or higher priority than the primary access category. In step 403, a Block Acknowledgment (BA) is received. The BA includes acknowledgment information for transmitted data that has an access category that has the same or higher priority than the primary access category.

Figure 11:
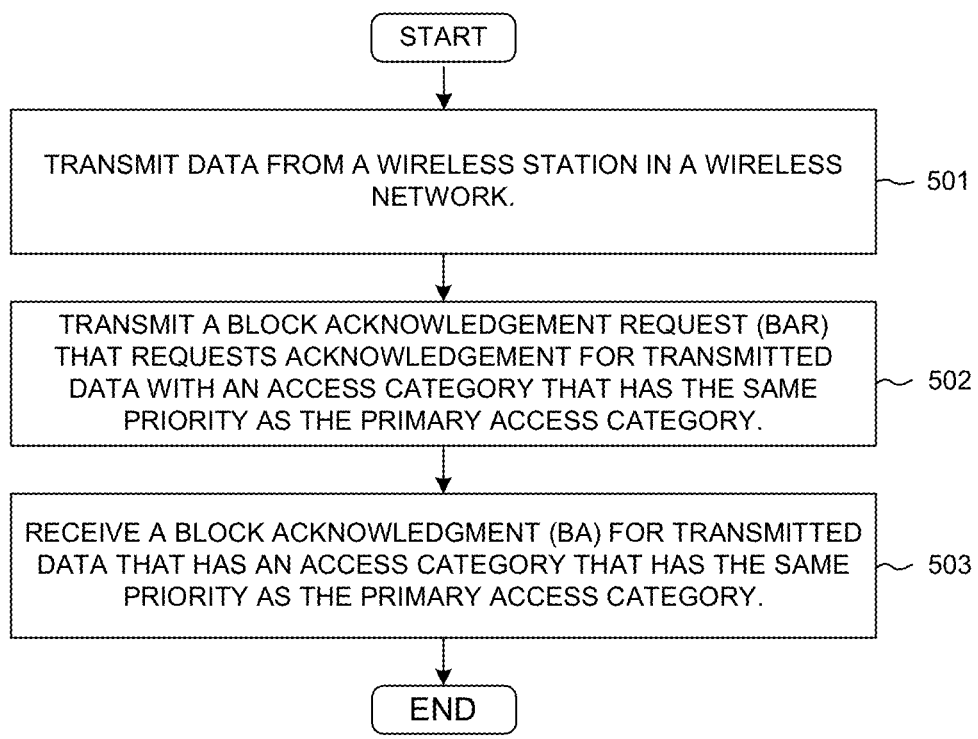
FIG. 11 is a flow chart of a method of determining a Multiple Traffic Identification (M-TID) Block Acknowledgment Request (BAR) in accordance with another novel aspect.

FIG. 11 is a flow chart of a method of determining a Multiple Traffic Identification (M-TID) Block Acknowledgment Request (BAR) in accordance with another novel aspect. In step 501, data is transmitted from a wireless station within a wireless network. In step 502, a Block Acknowledgment Request (BAR) is transmitted. The BAR requests acknowledgment for transmitted data with an access category that has the same priority as the primary access category. In step 403, a Block Acknowledgment (BA) is received. The BA includes acknowledgment information for transmitted data that has an access category that has the same priority as the primary access category.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) transmitting data by a wireless station (STA);
   (b) transmitting a Block Acknowledgement Request (BAR) by the wireless station (STA); and
   (c) receiving a Block Acknowledgement (BA) by the wireless station (STA), wherein the BA is transmitted from another wireless device, and wherein the step of transmitting BAR by the wireless STA requests an acknowledgment for transmitted data with an access category that has the same or higher priority than a primary access category.

2. The method of claim 1, wherein the data includes more than one frame having the same Multiple Traffic Identifier (MTID).

3. The method of claim 1, wherein the data includes more than one frame having the same Multiple Traffic Identifier (MTID), and wherein the BA acknowledges transmitted data with an access category that has the same or higher priority than a primary access category.

4. The method of claim 1, wherein the Block Acknowledgement Request (BAR) includes a Block Acknowledgement Request (BAR) information field.

5. The method of claim 4, wherein the Block Acknowledgment Request (BAR) information field includes Traffic Identifier (TID) information and Block Acknowledgement (BA) starting sequence control information.

6. The method of claim 1, wherein the Block Acknowledgement (BA) includes a Block Acknowledgement (BA) information field.

7. The method of claim 6, wherein the Block Acknowledgement (BA) information field includes Traffic Identifier (TID) information, Block Acknowledgment (BA) starting sequence information, and Block ACK Bitmap information.

8. A wireless device, comprising:
   at least one transceiver to exchange data with at least another wireless device;
   at least one processor; and
   a memory storing instructions that, when executed by the at least one processor, cause the wireless device to:
   (a) transmit data;
   (b) transmit a Block Acknowledgment Request (BAR); and
   (c) receive a Block Acknowledgement (BA), wherein the transmit of the BAR requests an acknowledgment for transmitted data with an access category that has the same or higher priority than a primary access category.

9. The wireless device of claim 8, wherein the data includes more than one frame having the same Multiple Traffic Identifier (MTID), and wherein the BAR requests an acknowledgment for transmitted data with an access category that has the same or higher priority than a primary access category.

10. The wireless device of claim 8, wherein the data includes more than one frame having the same Multiple Traffic Identifier (MTID), and wherein the BA acknowledges transmitted data with an access category that has the same or higher priority than a primary access category.

11. The wireless device of claim 8, wherein the Block Acknowledgement Request (BAR) frame includes a Block Acknowledgement Request (BAR) information field.

12. The wireless device of claim 11, wherein the Block Acknowledgment Request (BAR) information field includes Traffic Identifier (TID) information and Block Acknowledgement (BA) starting sequence control information.

13. The wireless device of claim 8, wherein the Block Acknowledgement (BA) frame includes a Block Acknowledgement (BA) information field.

14. The wireless device of claim 13, wherein the Block Acknowledgement (BA) information field includes Traffic Identification (TID) information, Block Acknowledgment (BA) starting sequence information, and Block Ack Bitmap information.

15. The wireless device of claim 8, wherein the wireless device is a wireless station (STA) in a wireless local area network (WLAN).

* * * * *